July 27, 1965

H. N. IPSEN 3,196,699

ACTUATING MECHANISM

Filed April 2, 1962

INVENTOR
Harold N. Ipsen
by Wolfe, Hubbard, Voit & Osann
ATTORNEY

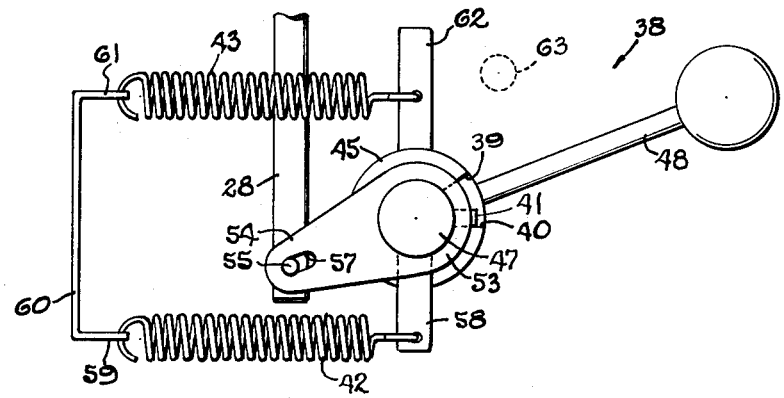
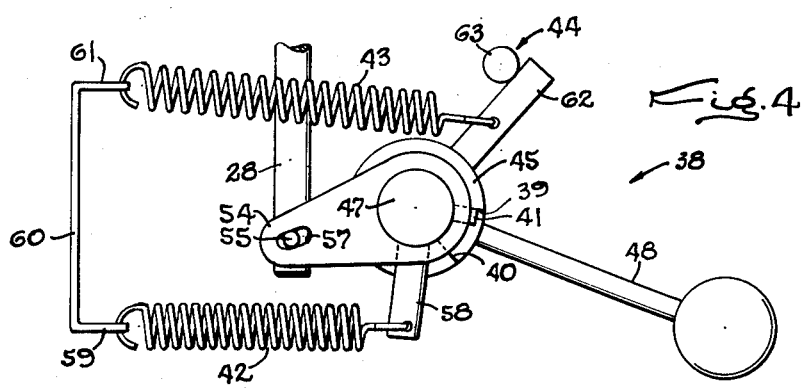

United States Patent Office 3,196,699
Patented July 27, 1965

3,196,699
ACTUATING MECHANISM
Harold N. Ipsen, P.O. Box 500, Rockford, Ill.
Filed Apr. 2, 1962, Ser. No. 184,299
5 Claims. (Cl. 74—96)

This invention relates to an actuating mechanism particularly adapted for opening and closing a passage having a pressure differential on opposite sides of the valve and, more particularly, to a valve mechanism including a pilot valve actuator movable back and forth by an operator to open and close a main valve to reduce the pressure differential in the passage and then moving the main valve toward the high pressure end of the passage and into an open position.

The primary object of the present invention is to provide in a mechanism of the above character a simple mechanical operator which is manually actuated to open the pilot valve and reduce the pressure differential and which automatically opens the main valve upon the attainment of a predetermined reduced pressure differential.

Other objects and advantages of the invention will become apparent from the following detailed description taken in connection with the accompanying drawings, in which FIGURE 1 is a fragmentary side elevational view of an actuating mechanism embodying the novel features of the present invention with parts broken away and shown in section.

FIG. 3 is an enlarged fragmentary sectional view taken along the line 3—3 of FIG. 1.

FIG. 4 is an enlarged fragmentary sectional view taken along the line 4—4 of FIG. 2.

FIG. 5 is a view similar to FIG. 4 with the parts in different positions.

Figure 1:
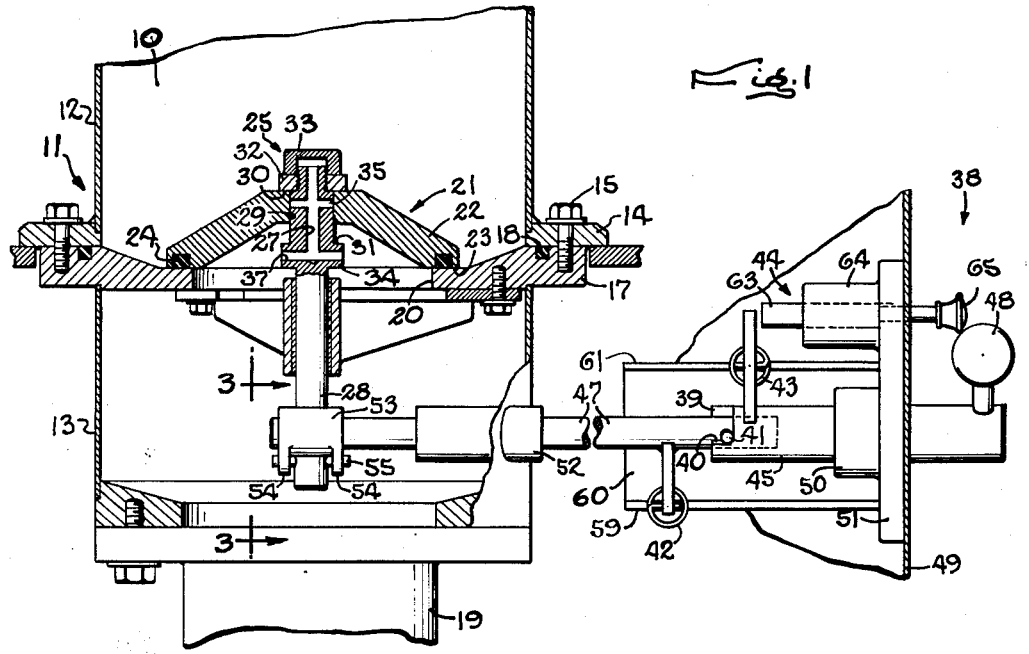
Figure 2:
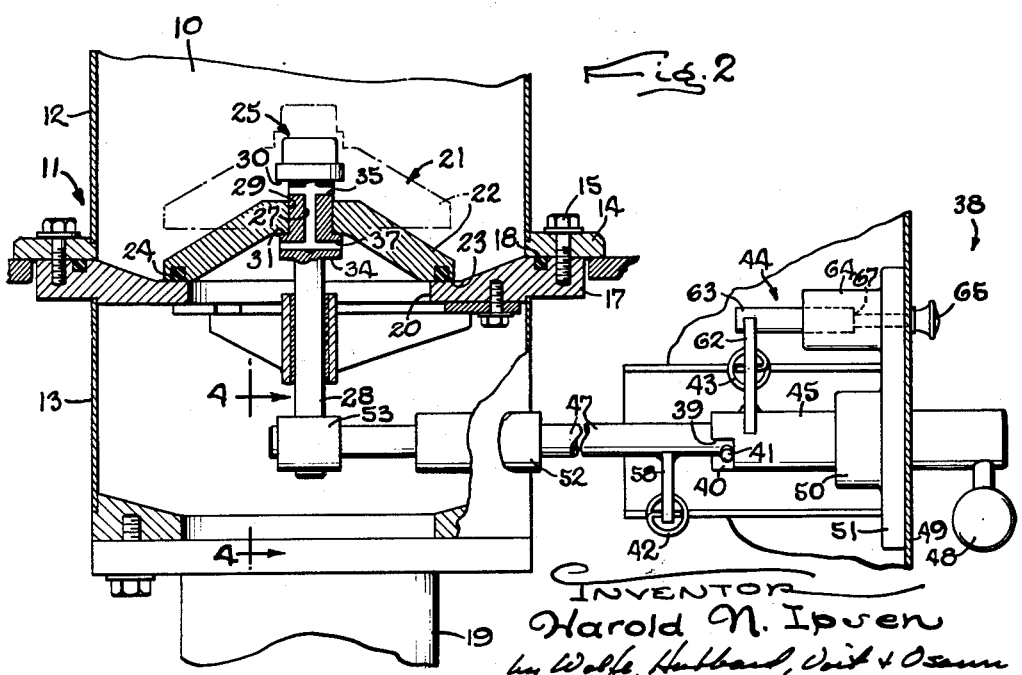
FIG. 2 is view similar to FIG. 1 with the parts in different positions.

As shown in the drawings for purposes of illustration, the invention is embodied in a valve actuating mechanism for opening and closing a passage 10 having a pressure differential on opposite sides of the valve when the latter is closed. As shown in FIGS. 1 and 2, the valve mechanism includes a body 11 formed by two hollow cylinders 12 and 13 disposed end to end with an annular flange 14 extending around one end of the cylinder 12 bolted at 15 to a ring 17 fast on the adjacent end of the cylinder 13. To seal the connection between the cylinders, an O ring 18 is pressed between the flange and the ring 17. The upper open end of the cylinder 12 may be connected to a furnace chamber (not shown) to be evacuated preparatory to a heat treating operation and the cylinder 13 may be connected through a pipe 19 bolted to the lower end thereof to a suitable vacuum pump (not shown). Thus, the center hole of the ring 17 forms a valve port 20 communicating between the upper, high pressure end of the passage and the lower, low pressure end thereof.

To open and close the passage, a main valve 21 comprising a dished disc 22 larger than and opening toward the port 20 is disposed above the ring 17. This disc is formed with a flattened annular surface 23 adapted to abut against the upper side of the ring around the port, and a seal ring 24 is pressed into a groove in the surface 23 to prevent leakage between the ring and the disc when the valve is closed. It will be seen that the higher pressure above the disc normally holds the main valve tightly closed, and when the disc is moved away from the ring against this pressure, the valve is opened to connect the pump to the chamber.

In order that the main valve may be opened with a relatively small force, a pilot valve 25 is provided to open a small conduit 27 through the disc so that the pressure differential, and thus the resistance force, may be reduced substantially through the conduit before the disc itself is moved. For this purpose, the pilot valve includes an actuator in the form of a rod 28 guided for back and forth endwise sliding in a center hole 29 in the disc and formed with oppositely facing shoulders 30 and 31 above and below the disc, the shoulders being spaced apart a distance greater than the thickness of the disc thereby to form a lost motion connection permitting limited endwise movement of the rod relative to the disc. In the present instance, the upper shoulder 30 is formed by a washer 32 held on the rod by a cap 33 threaded onto the upper end of the rod and the lower shoulder 31 is formed by an enlargement 34 intermediate the ends of the rod.

The conduit 27 comprises an axial hole drilled into the rod from the upper end thereof and communicating adjacent its upper end with radially opening ports 35 disposed just below the shoulder 30, and communicating adjacent its lower end with additional ports 37 opening through the enlargement just below the shoulder 31. With this arrangement, movement of the actuator rod 28 downwardly relative to the disc shifts the ports 35 to positions within the center hole and brings the washer 32 against the top of the disc to pull the latter downwardly into the closed position (FIG. 1). Thus, both the pilot valve and the main valve are closed. From this valve closing position of the rod, the latter is movable to an intermediate position shown in full in FIG. 2 and then to the valve opening position indicated in broken lines in FIG. 2. When the rod is moved upwardly relative to the disc, the ports 35 first are shifted to positions above the disc (FIG. 2) and the lower shoulder 31 is shifted into abutting engagement with the underside of the disc. Accordingly, the vacuum pump communicates with and evacuates the high pressure end of the passage through the ports 37, the conduit, and the ports 35. It will be apparent that a substantially smaller force is sufficient to open the pilot valve than would be required to open the main valve.

After the pressure above the main valve has been reduced through the conduit 27, however, a relatively small opening force is effective to open the main valve. An operator 38 is provided first to open the pilot valve and then to apply a predetermined opening force on the main valve to open the latter when the force of the pressure differential has been substantially reduced.

The present invention contemplates the provision of a simple mechanical operator 38 which is manually actuated to open the pilot valve 25 and initiate evacuation of the high pressure end of the passage and which automatically opens the main valve 21 upon the attainment of a predetermined reduced pressure differential on opposite sides of the valve. To these ends, two abutments 39 and 40 spaced a predetermined distance apart and movable with the operator are disposed on opposite sides of an element 41 movable with the rod 28 so that one abutment 39 picks up the element 41 and moves the latter and the rod in a direction to open the pilot valve and the main valve when the operator is moved in the other direction. A spring 42 is provided to exert a predetermined force on the element less than the force resulting from the full pressure differential and in a direction to open the pilot valve when the pressure differential is reduced to a value corresponding to the spring force, this spring urging the element away from the abutment to move both the rod and the disc further upwardly.

Preferably, a second spring 43 urges the operator in a direction to close both the pilot valve and the main valve, this spring being the stronger of the two and urging the abutment 40 toward the element 41 whereby the valves are held closed prior to evacuation of the furnace chamber. Further, a latch 44 engageable with the operator when the pilot valve is open holds the operator, against the force of the spring 43, in a position to keep the pilot valve open until the predetermined reduced pressure differential is attained whereupon the spring 42 moves the element 41 relative to the operator, as permitted by the spacing of the abutments 39 and 40, and opens the main valve.

In the present instance, the abutments 39 and 40 are formed on one of two relatively movable members 45 and 47 and the element 41 is carried on the other member, one of the members being connected to the pilot valve rod 28 and the other being connected to a hand lever 48 for movement back and forth thereby. Herein, the member 45 comprises a sleeve projected through an exterior wall 49 (FIGS. 1 and 2) of the furnace cabinet and journaled in a bearing 50 fast on a mounting plate 51 on the inner side of the wall with the hand lever mounted on the outer end of the sleeve. The member 47 is a shaft concentric with the sleeve and journaled intermediate its ends in a bushing 52 fast in the wall of the valve body. One end portion of the shaft extends into the passage 10 and is disposed alongside the lower end portion of the rod 28, and the opposite end of the shaft telescopes into the open inner end of the sleeve. Suitable seal rings (not shown) are pressed between the bushing and the shaft to prevent leakage into the valve body through the bushing.

Mounted on the inner end of the shaft for rotation therewith is a sleeve 53 carrying two axially spaced, radially extending arms 54 disposed on opposite sides of the rod and coupled thereto by a pin 55 with its opposite ends projecting from opposite sides of the rod and into alined, radially elongated slots 57 (FIGS. 3 through 5) adjacent the free ends of the arms. Thus, the arms and the pins join the shaft to the rod for endwise movement of the latter as the shaft rotates back and forth to swing the free ends of the arms up and down. The slots 57 are elongated to accommodate the variations in the radial spacing of the pin from the axis of the shaft in the different axial positions of the rod.

Herein, the abutments 39 and 40 comprise the opposed, angularly spaced surfaces of a notch (see FIGS. 1 and 2) formed in the inner end of the sleeve 45, and the element 41 is a pin fast at one end on the shaft and projecting radially outwardly through the notch, the diameter of the pin being substantially less than the spacing of the surfaces 39 and 40. Accordingly, the pin and notch cooperate to form a lost motion connection between the shaft and the sleeve and, therefore, between the operator hand lever and the pilot valve.

Preferably, the spring 42 urging the shaft 47 and the rod 28 in a direction to open the pilot valve is of the coiled contractile type and is connected at one end to a lug 58 rigid with the shaft on one side of the latter, the lower side as shown herein, and at the other end to the lower leg 59 of a bracket 60 supported on the cabinet wall and projecting inwardly therefrom alongside the sleeve and the shaft. Accordingly, this spring urges the shaft clockwise as viewed in FIGS. 3 through 5 to move the rod upwardly. The stronger spring 43 also is of the coiled contractile type and is stretched between the upper leg 61 of the bracket and a lug 62 rigid with the sleeve on the side thereof opposite the lug 58.

It will be apparent that the stronger spring 43 turns the sleeve counterclockwise about the shaft until the abutment 40 picks up the pin, and then turns the shaft and the sleeve in unison until the pilot valve and the main valve are closed (FIGS. 1 and 3), this being the rest position of the operator. When it is desired to open the pilot valve, the hand lever 58 is swung clockwise from the rest position to the valve opening position shown in FIGS. 2 and 4. Initially, rotation of the sleeve merely shifts the abutment 39 into engagement with the pin 41 and has no effect on the pilot valve which is held closed against the action of the spring 42 by the force of the pressure differential acting on the rod.

After the abutment 39 picks up the pin, however, continued movement of the hand lever moves the shaft and the rod with the sleeve and, therefore, opens the pilot valve to begin evacuation of the furnace chamber through the conduit. When the pilot valve is open, the shoulder 31 is disposed against the underside of the disc 22 and the pressure differential acting on the disc holds the main valve closed against the action of the spring 42.

The latch 44 is included to hold the operator in the valve opening position during the evacuation of the chamber so that opening of the main valve occurs automatically in response to the attainment of a predetermined reduced pressure differential in the passage and without the continued attention of the attendant. In the present instance, the latch is formed by an elongated pin 63 movable into a blocking position along the path followed by the lug 62 as the hand lever is moved from the rest position to the valve opening position, the pin being positioned along the path to abut against the lug when the pilot valve is open and block return of the lug and, consequently, the sleeve and the hand lever, to the rest position.

For this purpose, the pin 63 is projected through the cabinet wall 49 and the plate 51 is guided for back and forth endwise sliding relative thereto in a bearing 64 mounted on the plate. Inward sliding of the pin is limited by a knob 65 fast on the outer end of the pin to abut against the wall 49 when the pin is in its blocking position, and outward sliding is limited by a shoulder 67 located intermediate the ends of the pin to abut against the plate 49 when the inner end portion of the pin is out of the path of the lug 62.

When the operator is latched in the valve opening position (FIGS. 2, 4 and 5) with the pilot valve open and the shoulder 31 abutting against the underside of the disc 22, the furnace is evacuated through the open conduit 27. At the same time, the spring 42 continuously applies a predetermined force on the shaft 47 and the rod 28 in a direction to open the main valve. Because the pin 41 is disposed against the abutment 39 and is spaced from the abutment 40 (FIG. 4), the only force resisting the spring 42 is the force of the pressure differential acting on the main valve. Accordingly, when the resulting closing force of the pressure differential is reduced to a value less than the spring force, the spring rotates the shaft and moves the rod upwardly until the pin 41 swings against the abutment 40 and is held thereby against further movement. Thus, the spacing of the abutments determines the distance the main valve is opened, this distance being sufficient to open a passage of substantial area around the disc.

When the furnace pressure has been reduced to the proper heat treating level, the latch pin is pulled outwardly thereby releasing the sleeve to the action of the stronger spring 43 which returns the hand lever to its rest position and closes both valves. If desired, a solenoid (not shown) responsive to the furnace pressure may be provided to trip the latch automatically as an incident to the attainment of a predetermined vacuum pressure.

I claim as my invention:

1. In an actuating mechanism, the combination of, a body, an actuator mounted on said body for movement from a first position through an intermediate position, from said intermediate position to a second position against a resistance force, and then back to said first position, a shaft rotatably mounted on said body and connected to said actuator to move the latter back and forth between said first and second positions upon turning of said shaft back and forth, a sleeve telescoped onto and rotatable about said shaft, first and second angularly spaced opposed abutment surfaces on said sleeve, an element on said shaft disposed between said surfaces whereby the shaft and said sleeve are coupled together to rotate in unison after a predetermined amount of relative rotation in either direction, a lever on said sleeve manually movable to rotate the sleeve back and forth about said shaft, movement of said sleeve in one direction first swinging said first surface against said element and then moving the latter in said one direction to shift said actuator into said first position while movement of the sleeve in the other direction turns said second surface into engagement with said element and moves the latter in said other direction to shift the actuator through said intermediate position and then into said second position, a first spring acting on said shaft to urge the shaft in said other direction, a stronger spring acting on said sleeve to urge the sleeve in said one direction whereby said actuator normally is held in said first position, and a latch operable to hold said sleeve against moving back in said one direction when said actuator is in said intermediate position whereby said first spring can move said actuator from said intermediate position to said second position, as permitted by the spacing of said surfaces, when the resistance force is less than the force of said first spring.

2. In an actuating mechanism, the combination of, a body, an actuator mounted on said body for movement from a first position through an intermediate position, from said intermediate position to a second position against a resistance force, and then back to said first position, a shaft member rotatably mounted on said body, a sleeve member telescoping with said shaft member and rotatable about the latter, a lost motion connection between said members coupling the members together for rotation in unison after a predetermined amount of relative rotation in either direction, one of said members being connected to said actuator to move the latter back and forth upon turning of said one member back and forth, rotation of said one member in one direction moving said actuator to said first position and rotation in the other direction moving said actuator from said first position through said intermediate position to said second position, a first spring urging said one member in said other direction, a stronger spring urging the other of said members in said one direction whereby said actuator normally is held in said first position, an operator on said other member movable in said other direction against said stronger spring first to take up the lost motion in said connection and then to move said one member in said other direction a distance sufficient to move said actuator in said intermediate position, and a latch engageable with said operator when said actuator is in said intermediate position and operable to hold the operator against moving back in said one direction whereby said first spring can move said actuator from said intermediate position to said second position, as permitted by the lost motion in said connection, when the resistance force is less than the force of said first spring.

3. In an actuating mechanism, the combination of, a body, an actuator mounted on said body for movement from a first position to an intermediate position, from said intermediate position to a second position against a resistance force, and then back to said first position, an operator manually movable back and forth relative to said body, a lost motion connection between said operator and said actuator whereby movement of the operator in one direction first takes up the lost motion in said connection and then shifts the actuator from said first position to said intermediate position, movement of the operator in the other direction shifting said actuator back to said first position, and a spring acting on said actuator to urge the latter from said intermediate position toward said second position independent of any further movement of said operator in said one direction after said actuator is in said intermediate position thereby to shift said actuator to said second position, as permitted by the lost motion of said connection, when the spring force is greater than said resistance force.

4. Mechanism as defined in claim 3 further including a latch selectively engageable with said operator when the latter is in said intermediate position and operable when engaged to hold the operator against moving back in said opposite direction.

5. Mechanism as defined in claim 3 including a second spring stronger than and opposing said first mentioned spring normally to hold said actuator in said first position.

References Cited by the Examiner

UNITED STATES PATENTS

| 1,655,729 | 1/28 | Jones | 137—630.14 |
| 1,998,913 | 4/35 | Wheaton | 137—630.14 |
| 2,595,813 | 5/52 | Raney | 74—469 |
| 2,856,788 | 10/58 | Jovanovich | 74—469 |

WILLIAM F. O'DEA, *Primary Examiner.*